US011911678B2

(12) United States Patent
Ignagni et al.

(10) Patent No.: US 11,911,678 B2
(45) Date of Patent: Feb. 27, 2024

(54) APPARATUS FOR PLAYING AND SUPPORTING A USER DURING A GAME

(71) Applicants: Blaise Anthony Ignagni, Oberlin, OH (US); Anthony Rocco Ignagni, Oberlin, OH (US)

(72) Inventors: Blaise Anthony Ignagni, Oberlin, OH (US); Anthony Rocco Ignagni, Oberlin, OH (US)

( * ) Notice: Subject to any disclaimer, the term of this patent is extended or adjusted under 35 U.S.C. 154(b) by 0 days.

(21) Appl. No.: 16/923,040

(22) Filed: Jul. 7, 2020

(65) Prior Publication Data

US 2021/0016147 A1 Jan. 21, 2021

Related U.S. Application Data

(60) Provisional application No. 62/874,685, filed on Jul. 16, 2019.

(51) Int. Cl.

| | |
|---|---|
| ***A63B 69/00*** | (2006.01) |
| ***A63B 71/00*** | (2006.01) |
| ***A61H 3/00*** | (2006.01) |
| ***A63C 3/04*** | (2006.01) |

(52) U.S. Cl.

CPC ........... *A63B 69/0026* (2013.01); *A61H 3/00* (2013.01); *A63B 71/0009* (2013.01); *A63C 3/04* (2013.01); *A63B 2210/50* (2013.01); *A63B 2225/093* (2013.01); *A63B 2225/74* (2020.08)

(58) Field of Classification Search

CPC .......... A63B 69/0026; A63B 2225/093; A63B 71/0009; A63B 2225/74; A63B 2210/50; A63C 3/04; A61H 3/00

USPC .................................................. 473/446, 422

See application file for complete search history.

(56) References Cited

U.S. PATENT DOCUMENTS 2,577,186 A * 12/1951 Florer .................. A63B 69/408 124/16
4,021,033 A * 5/1977 Auclair .............. A63B 69/0022 482/66
4,363,311 A * 12/1982 Rodney ................ A63B 69/408 124/16
5,347,666 A * 9/1994 Kippes ..................... A61G 7/10 135/67
5,397,154 A * 3/1995 Baldwin .................. A63C 3/00 188/8
5,672,116 A * 9/1997 Bryan ................ A63B 71/0009 124/1
5,807,185 A * 9/1998 Raubuck ................ A63B 65/12 124/1

(Continued)

*Primary Examiner* — Mitra Aryanpour

(74) *Attorney, Agent, or Firm* — Kathryn Perales

(57) ABSTRACT

A skating frame which incorporates hockey flippers to allow inexperienced skaters to play hockey while learning to skate. It is designed to be used as a multi surface game apparatus, allowing for wide accessibility. The apparatus aims to increase the people that can play hockey by allowing inexperienced skaters, when used on ice, to maintain balance and be supported while allowing them to also be able to interact with the object in play. The apparatus may also be adapted for ground use to help those with mobility impairments to play floor hockey. The interaction with the object used in the game is facilitated by the flipper blades that run along the play surface allowing the user to engage with the play object easily without having to compromise their support.

18 Claims, 3 Drawing Sheets

(56) References Cited

U.S. PATENT DOCUMENTS

| | | | | | |
|---|---|---|---|---|---|
| 6,165,084 | A * | 12/2000 | Cranston | A63B 69/0026<br>280/818 |
| 6,170,840 | B1 * | 1/2001 | Mathias | A63B 69/0064<br>135/69 |
| 6,712,744 | B2 * | 3/2004 | Buechel, Jr. | A63B 3/00<br>280/30 |
| 7,369,943 | B2 * | 5/2008 | Adams | A61G 5/042<br>180/907 |
| 7,850,576 | B2 * | 12/2010 | Sellke | A63B 63/004<br>482/51 |
| 8,303,421 | B1 * | 11/2012 | Farley | A63F 9/02<br>434/21 |
| 8,326,473 | B2 * | 12/2012 | Simpson | G05D 1/0293<br>701/22 |
| 8,973,935 | B2 * | 3/2015 | Salvan | A61G 5/1054<br>280/250.1 |
| 2017/0095717 | A1 * | 4/2017 | Simonov | A63B 69/0053<br>473/446 |
| 2019/0232102 | A1 * | 8/2019 | Hoobler | A63B 22/20 |
| 2021/0016147 | A1 * | 1/2021 | Ignagni | A63B 69/0026<br>473/446 |
| 2021/0379460 | A1 * | 12/2021 | Megan | A63B 69/0026<br>473/446 |

* cited by examiner

APPARATUS FOR PLAYING AND SUPPORTING A USER DURING A GAME

BACKGROUND OF THE INVENTION

Field of the Invention

The invention relates to apparatus for physical training, more particularly exercising apparatus with gliders, and also playing sticks with bent or angled lower parts for hitting an object on the ground or on an ice-covered surface. The invention also relates to appliances for aiding people to walk about.

Description of the Related Art

In most ice rinks there are skating tutors, which are metal or plastic frames that people hold onto as they slide along the ice, supporting them as they skate. These skating tutors are widespread in ice rinks because many people enjoy going skating but can't skate, so they use these skating tutors to help them skate. Another common thing found at ice rinks is ice hockey. The main deterrent stopping people from playing hockey is the difficulty of skating. If somehow you could get rid of this barrier created by the difficulty of skating, it will open a doorway bringing more of the community to the ice rinks.

BRIEF SUMMARY OF THE INVENTION

The invention is an apparatus designed to give those who are unable to skate or have movement impairments the ability to play a similar game to hockey. For this reason, the apparatus fuses the aspects of hockey with skating tutors to give the user stable movement while playing the game. The apparatus is built like a skating tutor, and can be made to have wheels or other contact surfaces on the bottom for dry land use. It has a front and two sides made by a plastic, metal, composite, or other material. It can either have a skeleton design or whole sides, so the object used in the play does not bounce up and injure the user. The apparatus can additionally have features that trap or guide the object in play. For on-ice play, there may be nothing except the shooting/propulsion devices attached to the bottom allowing the apparatus to slide along the ice smoothly. Alternatively, the apparatus may have ski, skate, or other surfaces in contact with the ice or other playing surface to help smoothly guide the apparatus on the surface. For dry land use, pivoting wheels or other types of surface contacts may be fitted to the bottom along with the propulsion devices, allowing the apparatus to roll along the playing area. Two propulsion devices, or flippers, are attached to the bottom of the apparatus, which are used to hit the object in play. These propulsion devices can be shaped like the ends of sporting sticks such as the ends of hockey, baseball, lacrosse sticks and others.

The energy needed to propel the object used in the game may be provided to the flippers through a cable that runs from the flippers, through the frame, and connects to levers on the handles. Other mechanisms of action, equivalent to a cable drive, may be implemented to control the flippers or other propulsion device(s). When a lever is pulled, it retracts the cable, in turn pulling on and rotating the cam, thus creating the rotational energy needed to propel the flipper. The propulsion device changes this linear motion provided by the cable to rotational motion by using a cam that is centered on a rotating axis. At the bottom of the rotational axis is the flipper blade holder so that when the cam is pulled by the cable, the cam, axis and flipper holder all rotate together. Also contained in the flipper mechanism is a tension spring or other device that causes the cam to return to its resting position after the handle is released, making the propulsion device return to its previous position. Other mechanisms may be devised to translate a hand control into a movement of the propulsion device.

The game is played by two teams of one or more people. The objective is to outscore the opposing team by putting the playing object in the opposing team's net, while protecting your net so the other team does not score on your team. The size of the playing field can be changed to fit the area used, and team size can be varied along with this, but no matter the size, the playing field is divided into three equal zones. Two of these zones are located on the opposite sides of the playing field, with the third zone in between, separating the two other zones. The game consists of three periods of fifteen minutes, but can be changed for personal preferences. The time is only stopped due to penalties, goals, or when the playing object is shot out of play or offsides. Offsides is where you are in the offensive zone before the playing object enters and then you play the playing object without first leaving the zone. The penalties in this game can be changed to include more or less, due to personal preference.

Other games or individual use, as in games of skill, may be devised with the apparatus. The apparatus may be modified as an adaptive aid for disabled use in sports. The apparatus may be modified to include a seat or other means for a disabled individual to participate. The apparatus may be used as a walker for people needing support. The apparatus may be used as a skating aid without use in a sporting game.

Components of the apparatus may be replaceable or interchangeable. The propulsion device may clip in and out of the apparatus to exchange when broken, upgraded, or changed depending on the game being played. The surface contact components may be changed depending on the playing surface or other characteristics of use or game being played. The handles may be modified to have specific adaptations for the user. The apparatus may be collapsible or modular for easy storage or transport.

The apparatus may be colored to denote a team grouping. It may have a number or other identifier to individually identify it within the team group. The apparatus may have ability to be branded for a specific venue, team, or event. All of these features may be built into the apparatus or interchangeable at the time of use.

The apparatus may be configured with additional accessories, such as lights that may be controlled to incorporate into the environment and game play. For use in low light conditions, or by turning off ambient lights in a facility, the lights on the apparatus may be used to enhance the player experience. The lights may also be incorporated into game play by configuring a playing area such that player uses the apparatus to move through barriers such as a maze while controlling the lights on their individual apparatus, and "tagging" other players with a directed beam of light. The opposing player's apparatus may have a sensor to identify when they have been tagged with the beam of light, and it may signal their condition.

BRIEF DESCRIPTION OF THE DRAWINGS

FIG. 2 additionally shows the cross beam that joins the left and right sides of the frame.

DETAILED DESCRIPTION OF THE INVENTION

Figure 1:
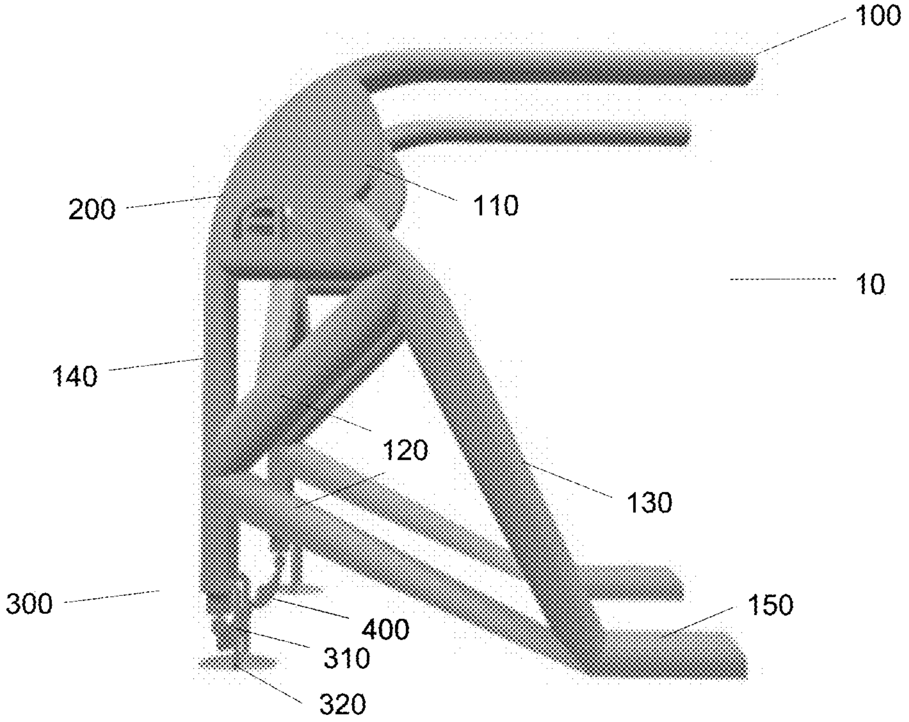
FIG. 1 shows a side view of the apparatus, including the frame and the two mechanisms used to rotate the propulsion devices on the front.
Figure 2:
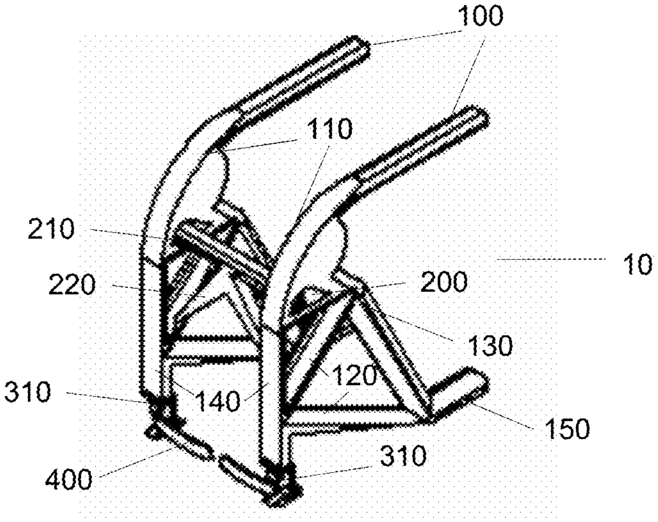
FIG. 2 is a rotated view of FIG. 1, giving a better representation of the width, with enough room to fit two propulsion devices on the front, one from each side.
Figure 3:
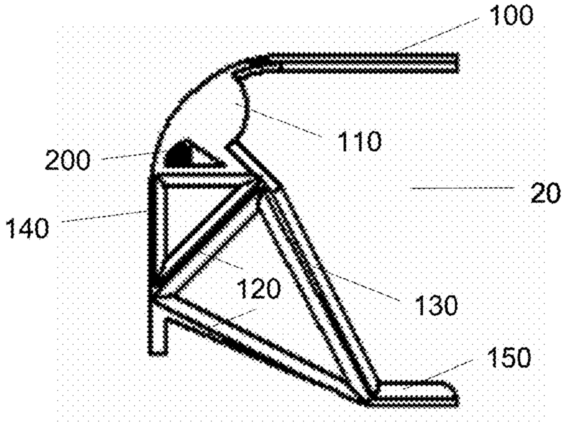
FIG. 3 shows a side view of a single side (left or right) of the frame, with the handle on top where the interior cable connects to the handle that then travels down the front of the frame, joining the propulsion device mechanism. In the center of the frame is also the clip that the cross beam fits into to connect the two frames.
Figure 4:
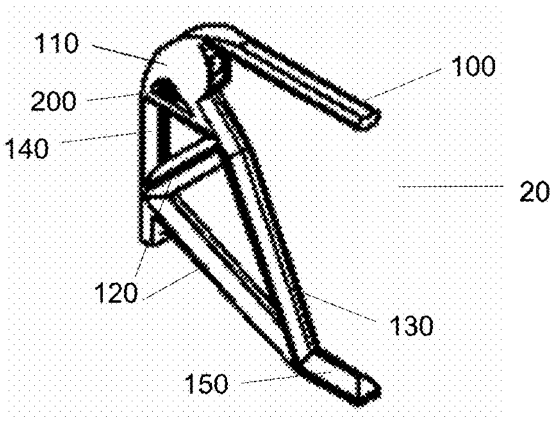
FIG. 4 is a rotated view of FIG. 3, showing both the length and width of the frame, with a clear emphasis on the supports connecting the rear surface contact to the connection for the propulsion device mechanism and the channel for the cable leading from the propulsion device mechanism to the handle.
Figure 5:
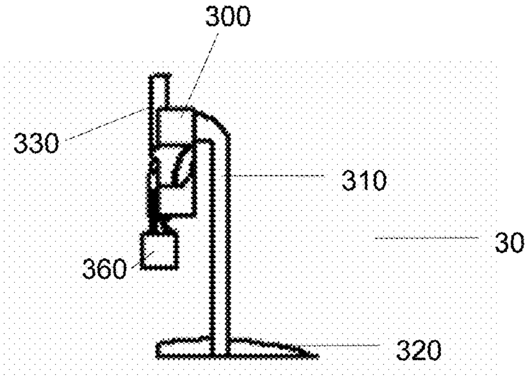
FIG. 5 is a side view of the propulsion device mechanism, with the front half of the housing invisible as to better see the inner mechanism, showing the height that the mechanism rests at within the casing, so as to hold the propulsion mechanism high enough to freely rotate.
Figure 6:
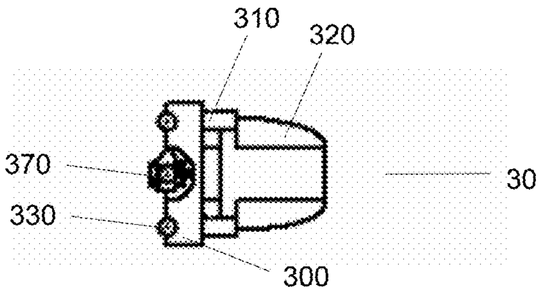
FIG. 6 is a top view of FIG. 5, showing the central axis of rotation around which the cam rotates. It also shows the two round pins on either side of the central axis, which pins act to hold the bottom mechanism to the frame.
Figure 7:
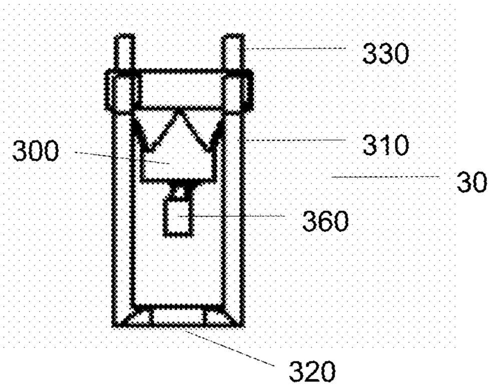
FIG. 7 is a view of the full propulsion device mechanism from the back. It shows the supports from the lower part, in contact with the ground, to the housing that holds the cam and rotating axis.
Figure 8:
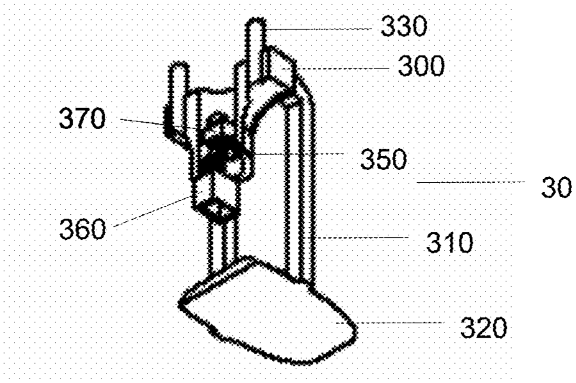
FIG. 8 is a front view of FIG. 5, slightly rotated to the lower right, and presents the connection between the rotation axis along with the cam. with the cable running down from the handle in order to change the lateral motion from the handle to the rotational motion passed from the cam to the propulsion device, through the connection box directly below the propulsion device or flipper.
Figure 9:
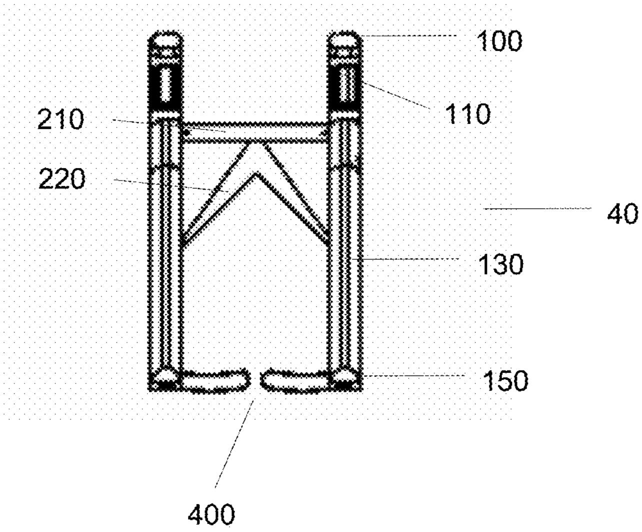
FIG. 9 Is a front view of the apparatus, showing the frame and propulsion mechanisms.

It is appreciated that this description is of one embodiment of the invention, but other methods of assembly and mechanisms may be incorporated to accomplish the claims provided below. The apparatus is specifically intended to provide a structure to be used as support, or simply to participate with others in a game that uses a mechanism to propel a playing object across a surface. While the structure may provide necessary support for balance and to assist in the user's movement, such as ice skating, the main purpose is to provide a means to propel an object while using the structure. Additionally, users who don't necessarily need the structure for support can use it to participate in a game with users that do need it for support. It should be noted that the terms user, player or participant are used synonymously. Also, the terms flipper, blade, paddle or stick may be used interchangeably to denote the part of the apparatus that strikes the object to propel it across the playing surface, and are generally referred to as the propulsion device, unless otherwise noted to make a distinction.

Referring to the drawings, the overall apparatus is identified with numeral 10. The frame components are identified with numeral 20. The overall rotational mechanism is identified with numeral 30. The flipper/propulsion device is identified with numeral 40.

It must be appreciated that the drawings represent one embodiment of the apparatus. The overall apparatus [10] may consist of a frame [20], rotational mechanism [30] and flipper [40] as described below. Alternatively, any one or more of those components may be configured differently to accomplish the purpose.

The handle beam [100] is the uppermost beam in the apparatus which contains the upper end of the cable which connects to the handle that protrudes from the handle beam. The elbow support [110] allows for the handle beam [100] to connect to the vertical support beam [140]. Also includes the possible addition of a rotating wheel allowing for the cable to transition more smoothly from a horizontal path to a vertical one. The diagonal support beams [120] consist of two diagonal beams which attach to the vertical support beam [140] and the rear support beam [130], and provide structural support to the side frames. With both the diagonal and vertical beams maintaining the height of the apparatus, both may be adjustable allowing the user to adjust both the height and pitch of the handle beam. Integrated throughout the support beams are areas in which lighting systems (not shown) may be integrated for various other versions of play. The structures of the side frame [120], [130], and [140] may be configured as tubular to allow sliding adjustment of the top portion of the frame to slide into the bottom portion to allow for height adjustment.

The rear support beam [130] runs from the elbow support [110] to the rear surface contact [150], and serves to hold the rear surface contact [150] in place. The vertical support beam [140] houses the cable from the elbow support [110] down to the rotational mechanism housing [300] and supports the front of the apparatus. The rear surface contact [150] maintains contact with the playing surface while facilitating the possible addition of wheels, ice blades, or other shapes and devices.

The crossbeam contact eyelet [200] allows for the main horizontal crossbeam [210] to attach to the side frames. The eyelets are located just under the elbow supports [110]. The main horizontal crossbeam [210] holds the two side frames together, allowing the apparatus to consist of two parallel side frames. The diagonal crossbeam supports [220] attach to the main horizontal crossbeam [210] and increase the structural integrity of the crossbeam. While the various components of the crossbeam along with the main crossbeam hold a static position, the possibility for an adjustment in the length of the crossbeam to change the overall width of the apparatus is still available. The horizontal cross members, such as [210] may be configured as tubular to allow a left side of the frame [20] to slide closer or further away from a right-side frame [20], to adjust for width.

It should be appreciated that the frame portion [20] of the apparatus may have elements and structure to allow it to expand in height or width. Alternatively, the frame may take the solid form of an animal or other recognizable figure or object. Objects such as airplanes, vehicles, or other recognizable items may be used to create the basic frame of the apparatus.

The rotational mechanism housing [300] holds the rotational cam [350], the rotational axis [370] and the flipper blade holder [360]. This housing allows these parts to be connected to the rest of the apparatus, while remaining free to rotate. The flipper mechanism vertical supports [310] allow for the rotational mechanism housing [350] to be held suspended over the front surface contact [320], allowing enough room for the flipper blade [400] to fit between the two. The front surface contact [320] holds the flipper mechanism up off of the ground. The main frame contact rods [330] allow for the rotational mechanism housing to be secured to the side frames.

The rear surface contacts [150] and front surface contacts [320] are configured for the playing surface and comprise the surface contact elements. For play on an ice rink, they may be configured as blades or another shape with a hard surface for stability and low friction on the ice surface. For play in a gymnasium, recreation center, or roller rink, they may be casters or wheels to facilitate movement on a higher friction surface. The surface contact elements would be configured for the playing surface, and may include but not be limited to low-friction hard spheres, casters, runners, or rollers. The surface contact elements may be interchanged as appropriate for the playing surface, or when worn.

The rotational cam [350] has a cable (not shown) wrapped around it and allows the lateral motion of the cable to be translated to rotational motion around the rotational axis [370]. The flipper blade holder [360] allows the flipper blades [400] to be secured to the rotational axis [370]. The rotational axis [370] runs through the middle of the rotational cam [350], which rotates the axis, translating the energy to the flipper blade holder [360]. The rotational axis is held in the rotational mechanism housing [300], while remaining free to rotate.

A lever (not pictured) is attached to the handle beam [100] in a way that part of the lever is inside the handle beam and attached to the cable. This allows the lever to be used to pull the cable (not pictured). The cable runs from the lever through the handle beam [100], elbow support [110], and vertical support beam [140], and attaches to the rotational cam [350]. The cable transfers the force from the lever to the rotational cam [350]. The tension spring (not pictured) is a part of the flipper mechanism that allows the cam to maintain tension on the cable, and stay in the default position. It must be appreciated that the rotational mechanism [30] may be configured in a different manner to create the coupling from a hand control to the rotational action of the flipper.

The flipper blade [400] is attached to the flipper blade holder [360], which causes the blade to rotate and transfer energy to the object in play (puck, ball, etc.) It must be appreciated that the flipper mechanism [40] may be a removable cartridge that may be configured for the game or player preference. The blade may also be constructed of different materials in accordance with the playing surface, to maintain reliable contact with the playing surface. The flipper mechanism may be a hockey stick blade, straight or curved; a pinball type elastic flipper that propels the playing object with more action; it may mimic an anatomical part of an animal or other object part; or be so comprised to strike the playing object with the mechanism used to translate the hand control to the flipper. The propulsion device may be interchanged during game play when worn or broken. The propulsion device may be selected and changed depending on the object in play or the game being played.

We claim:

1. An apparatus for supporting a sports player while standing and ambulating on a playing surface, and for propelling a playing object across a playing surface, said apparatus comprising:
- a support frame having a height and width sized for supporting the sports player;
- two handle beams, each having a first end connected to the frame, and a second end connected to a handle, and each said handle is configured to be grasped by said standing and ambulating sports player;
- a plurality of surface contact elements positioned on a bottom of said frame, wherein said surface contact elements glide or roll along said playing surface;
- two movable propulsion devices for propelling an object, wherein said propulsion devices are attached to the frame near the bottom of the frame, in front of the surface contact elements;
- two rotational mechanisms, each located at the lowest end of a vertical support beam, and attached to one of said two movable propulsion devices which extend below each said rotational mechanism and vertical support beam positioned above the playing surface;
- two hand controls, each co-located with one of said handle and handle beam; and
- two cables, each having a first end and a second end extending from one of said hand controls at the first end to one of said rotational mechanisms at the second end, each said cable extending through and inside of a structure of the apparatus comprising one of said handle beam, an elbow support and a vertical support beam;

wherein said hand controls are configured to allow operation during ambulation; and wherein ambulating comprises one or more of skating, walking and running.

2. The apparatus of claim 1, wherein the width and height of said frame are adjustable.

3. The apparatus of claim 1, wherein said two propulsion devices comprise hockey stick blades.

4. The apparatus of claim 1, wherein said two propulsion devices comprise pinball flipper paddles.

5. The apparatus of claim 1, wherein said two propulsion devices are interchangeable.

6. The apparatus of claim 1, wherein said surface contact elements comprise wheels.

7. The apparatus of claim 1, wherein said surface contact elements are interchangeable and are selected from the group consisting of one or more of skis, skate blades, casters, runners, rollers and wheels.

8. The apparatus of claim 1, wherein lighting is incorporated into the apparatus to provide entertainment and play in low light conditions.

9. The apparatus of claim 1, wherein said frame is decoratively shaped to resemble one or more animals.

10. The apparatus of claim 9, wherein said one or more propulsion devices is decoratively shaped to resemble natural appendages.

11. The apparatus of claim 1, wherein the rotational mechanism comprises a rotational cam having a tension spring.

12. An apparatus for supporting a sports player while standing and ambulating on a playing surface and playing laser-tag, said apparatus comprising:
- a support frame having a height and width sized for supporting the sports player;
- two handle beams, each having a first end connected to the frame, and a second end connect to a handle, and each said handle is configured to be grasped by said standing and ambulating sports player;
- a plurality of surface contact elements positioned on the bottom of said frame, wherein said surface contact elements glide or roll along said playing surface;
- one or more lights mounted on said frame, which one or more lights are configured to emit one or more of visible light and infrared light;
- two hand controls which operate said lights, each hand control co-located with a handle beam and handle; and one or more sensors mounted on said frame, wherein said one or more sensors are configured to detect infrared light;

wherein said hand controls are configured to allow operation during ambulation; and wherein ambulating comprises one or more of skating, walking and running.

13. The apparatus of claim 12, wherein said frame is sized to fit through a course or maze.

14. The apparatus of claim 12, wherein the width and height of said frame are adjustable.

15. The apparatus of claim 12, wherein said surface contact elements comprise wheels.

16. The apparatus of claim 12, wherein said surface contact elements are interchangeable and are selected from the group consisting of one or more of skis, skate blades, casters, runners, rollers and wheels.

17. An apparatus for supporting a sports player while standing and skating on an ice playing surface, and for propelling a playing object across an ice playing surface, said apparatus comprising:

a support frame with a height and width sized for supporting the sports player;

two handle beams, each having a first end connected to the frame, and a second end connected to a handle, and each said handle is configured to be grasped by said standing and skating sports player;

a plurality of surface contact gliding elements positioned on a bottom of said frame, wherein said surface contact elements glide along said ice playing surface;

two movable propulsion devices for propelling an object, wherein said propulsion devices are attached to the frame near the bottom of the frame, in front of the surface contact elements;

two rotational mechanisms, each located at the lowest end of a vertical support beam, and attached to one of said two movable propulsion devices which extend below each of said rotational mechanism and vertical support beam positioned above the playing surface;

two hand controls, each co-located with one of said handle and handle beam; and two cables, each having a first end and a second end extending from one of said hand controls at the first end to one of said rotational mechanisms at the second end, each said cable extending through and inside of a structure of the apparatus comprising a said handle beam, an elbow support and a vertical support beam;

wherein said hand controls being configured to allow operation during skating.

18. The apparatus of claim 17, wherein the rotational mechanism comprises a rotational cam having a tension spring.

* * * * *